US009116819B2

(12) United States Patent
Cope et al.

(10) Patent No.: US 9,116,819 B2
(45) Date of Patent: Aug. 25, 2015

(54) REDUCING METADATA IN A WRITE-ANYWHERE STORAGE SYSTEM

(71) Applicant: DataDirect Networks, Inc., Chatsworth, CA (US)

(72) Inventors: Jason M. Cope, Columbia, MD (US); Paul J. Nowoczynski, Brooklyn, NY (US); Pavan Kumar Uppu, Laurel, MD (US); Donald J. Molaro, Cupertino, CA (US); Michael J. Piszczek, Laurel, MD (US); John G. Manning, Ellicott City, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 26 days.

(21) Appl. No.: 14/056,265

(22) Filed: Oct. 17, 2013

(65) Prior Publication Data

US 2014/0108723 A1  Apr. 17, 2014

Related U.S. Application Data

(60) Provisional application No. 61/715,238, filed on Oct. 17, 2012.

(51) Int. Cl.
*G06F 12/08* (2006.01)
*G06F 13/00* (2006.01)

(52) U.S. Cl.
CPC .................. *G06F 12/0866* (2013.01)

(58) Field of Classification Search
CPC ............ G06F 13/00; G06F 12/00; G06F 3/00
USPC ...................... 711/117; 710/52, 310
See application file for complete search history.

(56) References Cited

U.S. PATENT DOCUMENTS

| | | | | |
|---|---|---|---|---|
| 7,512,617 | B2* | 3/2009 | Lock et al. ........................... | 1/1 |
| 8,180,968 | B2* | 5/2012 | O'Krafka et al. .............. | 711/135 |
| 8,874,850 | B1* | 10/2014 | Goodson et al. ............... | 711/133 |
| 2011/0276746 | A1* | 11/2011 | Pruthi et al. .................. | 711/103 |
| 2012/0005431 | A1* | 1/2012 | Gross et al. .................... | 711/130 |
| 2013/0086324 | A1* | 4/2013 | Soundararajan et al. ..... | 711/122 |
| 2013/0151805 | A1* | 6/2013 | Fontignie et al. .............. | 711/170 |
| 2013/0262752 | A1* | 10/2013 | Talagala et al. ............... | 711/103 |
| 2014/0047183 | A1* | 2/2014 | Chawla et al. ................ | 711/119 |
| 2014/0047185 | A1* | 2/2014 | Peterson et al. ............... | 711/123 |
| 2014/0047190 | A1* | 2/2014 | Dawkins et al. .............. | 711/136 |
| 2014/0108723 | A1* | 4/2014 | Nowoczynski et al. ....... | 711/113 |
| 2014/0244897 | A1* | 8/2014 | Goss et al. .................... | 711/103 |

* cited by examiner

*Primary Examiner* — Christopher Shin
(74) *Attorney, Agent, or Firm* — SoCal IP Law Group LLP; Mark A. Goldstein (57) ABSTRACT

Systems and methods for reducing metadata in a write-anywhere storage system are disclosed herein. The system includes a plurality of clients coupled with a plurality of storage nodes, each storage node having a plurality of primary storage devices coupled thereto. A memory management unit including cache memory is included in the client. The memory management unit serves as a cache for data produced by the clients before the data is stored in the primary storage. The cache includes an extent cache, an extent index, a commit cache and a commit index. The movement of data and metadata is by an interval tree. Methods for reducing data in the interval tree increase data storage and data retrieval performance of the system.

20 Claims, 7 Drawing Sheets

REDUCING METADATA IN A WRITE-ANYWHERE STORAGE SYSTEM

RELATED APPLICATION INFORMATION

This patent claims priority from provisional patent application No. 61/715,238 filed Oct. 17, 2012 which is incorporated by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to data stored in a data storage system and an improved architecture and method for storing data so that it may be read more efficiently.

2. Description of the Related Art

A file system is used to store and organize computer data stored as electronic files. File systems allow files to be found, read, deleted, and otherwise accessed. File systems store files on one or more storage devices. File systems store files on storage media such as hard disk drives and solid-state storage devices.

Various applications may store large numbers of documents, scientific data, images, audio, videos and other data as objects using a distributed data storage system in which data is stored in multiple locations. Supercomputers store a large quantity of data quickly. It is advantageous to store and make the data available as quickly as possible. To improve supercomputer throughput, blocking or waiting for data to be stored should be reduced as much as possible.

Parallel log-structured file system techniques were introduced in the Zest check pointing file system and the Parallel Log-Structured File system (PLFS). Log-structured storage devices treat storage media as logs or circular buffers. Due to this data placement behavior, parallel log-structured file systems are highly write-optimized storage systems; they provide high-performance "write anywhere" data storage capabilities at the cost of potentially expensive "scan everywhere" data discovery capabilities. Client I/O requests stored on log-structured storage devices are appended to the end of the log (the tail) along with the request metadata. This yields fast, streaming performance for write workloads (no storage device seeks are required and file system metadata lookups are minimized on the write data path). However, this behavior can distort data locality or application intended data layouts. That is, the storage system absorbs the application-generated data in such a way that logically contiguous data segments persist on the physical media in random and/or noncontiguous data layouts. This "write anywhere" behavior causes clients to scan large segments of storage system logs for the request metadata when reading back bulk data so that the reassembled data is presented to the application in the logically correct and expected format. Pathological I/O patterns, such as random access patterns or highly fragmented interleaved I/O patterns, may increase the amount of request metadata stored in the system. This increase in request metadata puts additional pressure on the storage system index that maintains this data and increases data maintained to manage cached data items. It also increases data discovery costs because data lookups require a brute force scan of every log (or log-structured storage devices) to identify where any item is located in the storage system. The massive increase in request metadata in the pathological use cases makes data discovery and index maintenance inefficient and may make them intractable and non-scalable tasks.

DETAILED DESCRIPTION

The systems and methods described herein function as a component of a larger system that is responsible for the rapid storing of data from client to another over a high-bandwidth network. The storage system allows a client to present data to a storage node for storage purposes. The at large system employs algorithmic methods for addressing data on read and operations based on a hash function of the metadata for the data. Therefore, inquiry on for any data may be directed to the storage node whose address equals the output of the hash function of the data's metadata. Systems and methods employing this kind of hash function are described in co-pending patent application Ser. No. 14/028,292 filed Sep. 16, 2013.

According to the methods described herein, when a client (that is, computing nodes of a supercomputer or compute cluster, a server computer, computer workstation or other computing node or computing device or group thereof) creates large amounts of data very quickly, the data is initially stored in a cache memory, which may be considered a burst buffer or intermediate storage, before the data is stored in primary storage. As set forth in more detail in the above referenced co-pending patent application, a hash function is used to allocate where in the cache the data item will be stored. For each data item, the hash may be based on metadata for the data including commonly known or inferred parameters for the data item, such as, for example, a data item identifier, an offset for the data item, a size of the data item, a timestamp of when the file was created, and others. The hash function outputs the identifier of a hash table entry that contains the address of a cache location.

The system described herein reduces the amount of metadata required to describe and manage cached data. The system described herein is a multi-level metadata and data cache. The upper level extent cache optimizes access to distinct regions of files (via file handle and boundary identifiers) and minimizes access latency for recently accessed files. The lower level commit cache optimizes access to cached metadata and file context for each file tracked in the upper level cache. The system optimizes the access latency and storage requirements of data that is non-deterministically placed in a write-anywhere data storage system. The techniques described herein are used in managing the cache proactively to reduce the amount of overhead required to track and describe the data stored in the cache and the storage system.

Storing data in a tiered system in which data is initially stored in an intermediate storage consisting of Non-Volatile Memory (NVM) or volatile cache memory and then later written to primary storage such as hard disk drives helps achieve increased throughput of client devices and processors. In this way, the cache memory serves as a burst buffer. As used herein NVM refers to solid state drives aka silicon storage devices (SSDs), flash memory, NAND-based flash memory, phase change memory, spin torque memory, carbon nanotube memory, memristor memory and other non-volatile storage that may be accessed quickly compared to primary storage such as hard disk drives. The speed to access NVM may be an order of magnitude faster than accessing primary storage.

Figure 1:
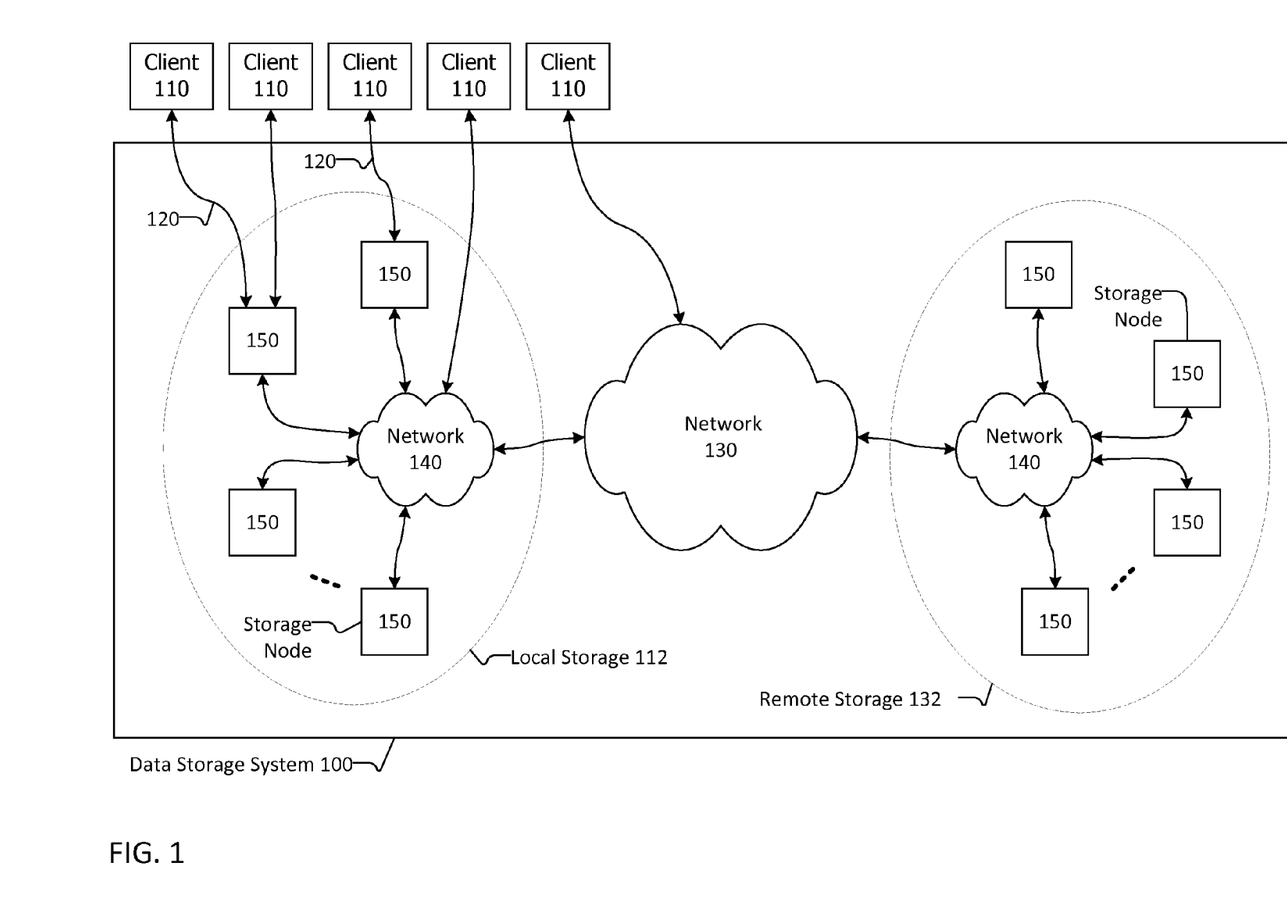
FIG. 1 is a block diagram of an example group of clients 110 and a data storage system 100.

FIG. 1 is a block diagram of an example group of clients 110 and a data storage system 100. As the method described herein may apply in various computing system configurations, the term client 110 is used. As used herein, client 110 refers to a computer processor included with other computer processors on a board or in a computing system, compute nodes of a supercomputer or compute cluster, a server computer, a computer workstation or other computing device with at least one processor. Each computing node has at least one processor and may have multiple processors, such as 2, 4, 8, 32, etc. Each processor may be a client. Each computing processor has at least one core and may have multiple cores, such as 2, 4, 8, 32, etc. Each core may be a client. The clients may be in one or more devices, racks, shelves or cabinets, or combinations thereof.

The connection from client 110 to a storage node 150 may be made by a direct connection 120 or through a network 130 and/or 140. The networks 130 and 140 may be a Local Area Network, a Wide Area Network (WAN), may be wired, and may be wireless, and may be a combination of these. The direct connection 120 from client 110 to a storage node 150 may be via a high speed connection such as a High Speed Interconnect (HSI) that may conform to the INFINIBAND, CASCADE, GEMINI architecture or standard and their progeny, may be an optical fiber technology, may be proprietary, and the like. The network 130 may be an HSI network, bus or similar architecture. The direct connection 120 from client 110 to a storage node 150 may be via a Universal Serial Bus, IEE 1394 FireWire or other physical (that is, wired) connection standard. The direct connection from client 110 to a storage node 150 may be via a wireless protocol such as WiFi.

Figure 2:
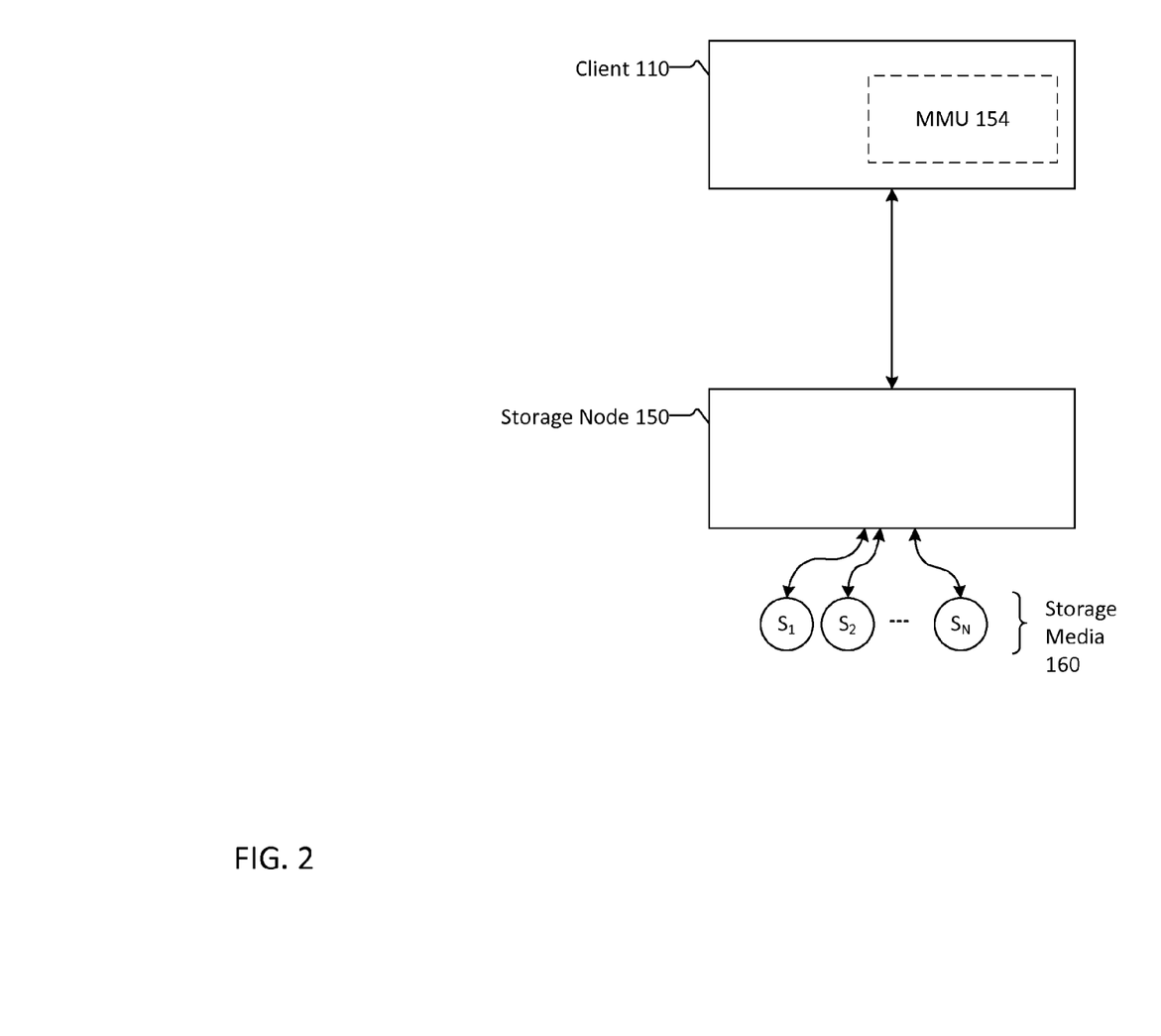
FIG. 2 is a block diagram of a client having a memory management unit included therein.

FIG. 2 is a block diagram of a client 110 having a memory management unit (MMU) 154 included therein. The MMU 154 includes intermediate storage in the form of cache memory. The cache memory may be NVM or volatile, in various embodiments. A hash table in the MMU 154 is used to maintain location information for stored data items, also referred to as Unstructured Layout Metadata (ULM) for data items stored by the clients 110. The MMU 154 is described in more detail below regarding FIG. 3. In one embodiment, the MMU 154 is included in a client 110 and accesses the storage media 160 via storage nodes 150. In another embodiment, MMU 154 is included in storage node 150 and coupled with primary storage, namely storage media 160.

Referring to FIG. 1 and FIG. 2, the storage nodes 150 may be storage servers that are independent of one another or may be in a peer-to-peer configuration. The storage nodes 150 and associated storage devices 160 may replicate data included in other storage nodes. The storage nodes 150 may be separated geographically, may be in the same location, may be in separate racks, may be in separate buildings on a shared site, may be on separate floors of the same building, and arranged in other configurations. The data storage system 100 described herein may include local storage 112 which is local or near to the clients 110 and may also include remote storage 132 which is in a location separate from the clients 110 such as down the hall, in another building, in another town or in another country. The storage nodes 150 communicate with each other and share data over networks 130 and 140. The networks 130 and 140 may be wired, wireless, may include wire lines, optical fiber cables, wireless communication connections, and others, and may be a combination of these and may be or include the Internet. The networks 130 and 140 may be public or private, may be a segregated network, and may be a combination of these. The networks 130 and 140 may include networking devices such as routers, hubs, switches and the like.

The storage nodes 150 may augment or enhance the capabilities and functionality of the data storage system by promulgating policies, tuning and maintaining the system, and performing other actions.

The term data item as used herein includes multiple bits, multiple bytes, multiple words, a block, a stripe, a file, a file segment, or other grouping of information. In one embodiment data items are stored within and by the data storage system as objects. As used herein, the term data item is inclusive of entire computer readable files or portions of a computer readable file. The computer readable file may include or represent text, numbers, data, images, photographs, graphics, audio, video, computer programs, computer source code, computer object code, executable computer code, and/or a combination of these and similar information.

The storage nodes 150 are servers that include software that may be perform some or all of the actions described herein. The storage nodes 150 may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the servers may include various specialized units, circuits, software and interfaces for providing the functionality and features described herein.

The processes, functionality and features described herein may be embodied in whole or in part in software which operates on one or more processors included in a client 110 and may be in the form of one or more of firmware, an application program, object code, machine code, an executable file, an applet, a COM object, a dynamic linked library (DLL), a dynamically loaded library (.so), a script, one or more subroutines, or an operating system component or service, and other forms of software. In other embodiments, the processes, functionality and features described herein may be embodied in whole or in part in software which operates on storage node and/or a controller included in or coupled with a client 110 or a storage node 150. In other embodiments, the processes, functionality and features described herein may be distributed such that some actions are performed by a client, some by another client, some by a storage node, and others by other controllers or servers.

A client 110 may be a computing device. A computing device as used herein refers to any device with a processor, memory and a storage device that may execute instructions such as software including, but not limited to, server computers. The computing devices may run an operating system, including, for example, versions of the Linux, Unix, MS-DOS, MICROSOFT® Windows, Solaris, Symbian, Android, Chrome, and APPLE® Mac OS X operating systems. Computing devices may include a network interface in the form of a card, chip or chip set that allows for communication over a wired and/or wireless network. The network interface may allow for communications according to various protocols and standards, including, for example, versions of Ethernet, INFINIBAND network, Fibre Channel, and others.

Referring again to FIG. 2, each of the storage nodes 150 include or are coupled with at least a storage medium or may be an independent network attached storage (NAS) device or system. The term "storage media" is used herein to refer to any configuration of hard disk drives (HDDs), solid-state drives (SSDs), silicon storage devices, magnetic tape, or other similar storage media. Hard disk drives, solid-states drives and/or other storage media 160 may be arranged according to any of a variety of techniques. The storage media are included in storage devices. As used herein, a storage device is a device that allows for reading from and/or writing to a storage medium such as storage media 160.

The storage devices 160 may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 1, 2 3 and 4 terabytes. Example hard disk drive specifications include Serial Attached Small Computer System Interface (SAS), Serial Advanced Technology Attachment (SATA), and others. An example storage node 150 may include 16 three terabyte 3.5" hard disk drives conforming to the SATA standard. In other configurations, there may be more or fewer drives, such as, for example, 10, 12, 24 32, 40, 48, 64, etc. In other configurations, the storage media 160 in a storage node 150 may be hard disk drives, silicon storage devices, magnetic tape devices, or a combination of these. In some embodiments, the physical size of the media in a storage node may differ, and/or the hard disk drive or other storage specification of the media in a storage node may not be uniform among all of the in primary storage devices 160.

The storage devices 160 may be included in a single cabinet, rack, shelf or blade. When the storage devices 160 in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage devices according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

The rack, shelf or cabinet containing a storage zone may include a communications interface that allows for connection to other storage zones, a computing device and/or to a network. The rack, shelf or cabinet containing storage devices 160 may include a communications interface that allows for connection to other storage nodes, a computing device and/or to a network. The communications interface may allow for the transmission of and receipt of information according to one or more of a variety of wired and wireless standards, including, for example, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing storage devices may include a network interface chip, chipset, card or device that allows for communication over a wired and/or wireless network, including Ethernet.

In some embodiments, data items such as files may be partitioned into smaller portions and stored as multiple objects among multiple storage devices 160 associated with a storage node 150. Files and other data items may be partitioned into portions referred to as objects and stored among multiple storage devices. The data items may be stored among storage devices according to the storage policy specified by a storage policy identifier. Various policies may be maintained and distributed or known to the storage nodes 150.

As used herein, policies define the replication and placement of data objects in the data storage system. Example replication and placement policies include, full distribution, single copy, single copy to a specific storage device, copy to storage devices under multiple servers, and others. A character (e.g., A, B, C, etc.) or number (0, 1, 2, etc.) or combination of one or more characters and numbers (A1, AAA, A2, BC3, etc.) or other scheme may be associated with and used to identify each of the replication and placement policies.

The data storage system 100 may provide for one or multiple kinds of storage replication and data resiliency. The data storage systems described herein may operate as a fully replicated distributed data storage system in which all data is replicated such that all copies of stored data are available from and accessible. This is referred to herein as a fully replicated storage system. Replication may be performed synchronously, that is, completed before the write operation is acknowledged; asynchronously, that is, the replicas may be written before, after or during the write of the first copy; or a combination of each. This configuration provides for a high level of data resiliency.

Another configuration of the data storage system 100 provides for partial replication such that data may be replicated in one or more locations in addition to an initial location to provide a limited amount of redundancy such that access to data is possible when a location goes down or is impaired or unreachable, without the need for full replication. Another configuration is when no replication exists such that data is stored solely in one location. However, resiliency may be provided by using various techniques such as by a RAID or other configuration.

When the clients 110 provide data at a very high speed, the data produced is stored initially in cache memory included in a memory management unit 154 in the storage nodes 150 or in the client itself.

Figure 3:
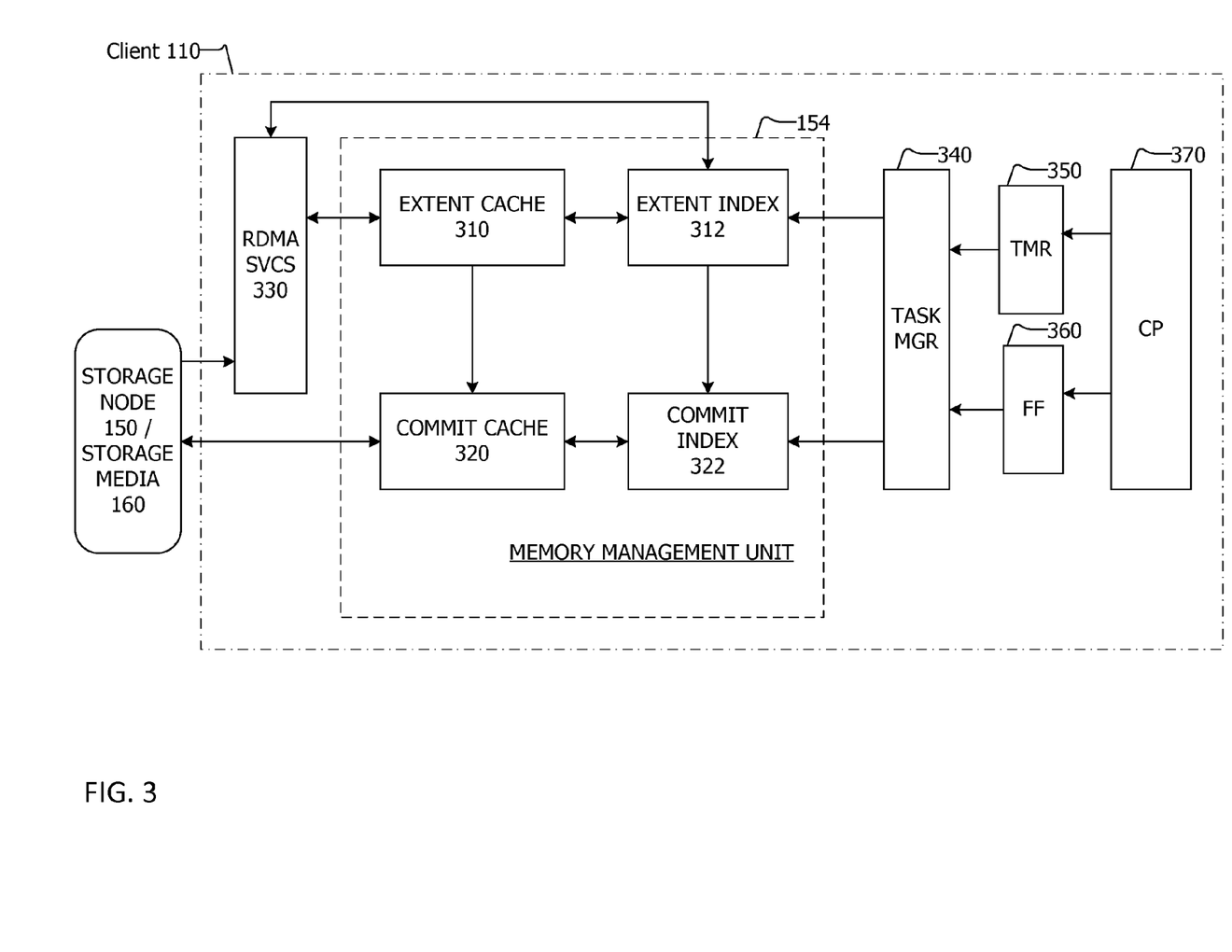
FIG. 3 is a block diagram of a client having a memory management unit and ancillary components described herein.

FIG. 3 is a block diagram of a client 110 having a memory management unit 154 and ancillary components described herein. According to the system described herein, the client 110 has an MMU 154 included therein or coupled thereto. The MMU 154 includes an extent cache 310, an extent index 312, a commit cache 320 and a commit index 322. The functioning of these components is described below regarding FIG. 4. The extent cache 310, extent index 312, commit cache 320 and commit index 322 may be stored on one memory chip or multiple memory chips. The extent cache 310 and extent index 312 may be considered an upper level cache and the commit cache 320 and commit index 322 may be considered a lower level cache, such that the MMU 154 is a tiered buffer or tiered cache.

The MMU 154 is managed by a controlling process (CP) 370 which initiates timers via timer TMR 350 and may order or initiate a forced flush via forced flush 360. The task manager 340 may prioritize and process the stimuli received from the timer 350 and the force flush 360.

The MMU may access remote or externally stored data items at other storage nodes via remote direct memory access (RDMA) services 330 or other protocols supported and provided on the client 110 (or in other configurations, on a storage node 150). Similarly, the MMU may receive requests for data items from remote or external storage nodes or clients via RDMA services 330.

Figure 4:
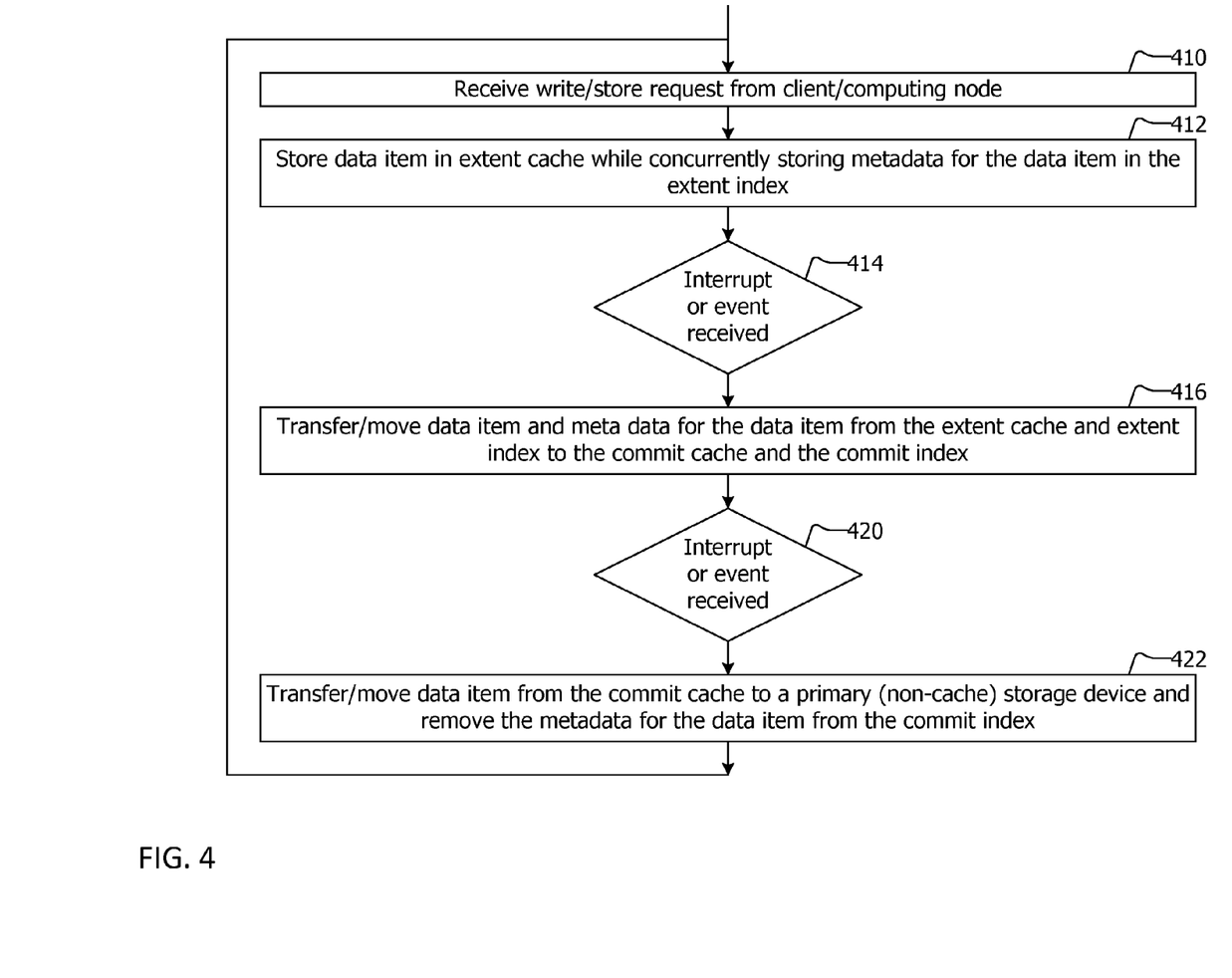
FIG. 4 is a flow chart of the actions taken to manage cache memory as described herein.

Referring now to FIG. 4, a flow chart of the actions taken to manage cache memory as described herein is shown. This flow chart is described with concurrent reference to the components shown in FIG. 3. In one embodiment the actions are taken by software and/or firmware in the MMU in conjunction with the controlling process on a processor in a client. The MMU 154 receives a write (store) request from a client 110, as shown in block 410. As described above regarding FIGS. 1 and 2, the MMU 154 is included in or coupled with a client 110 that is a computing node of a supercomputer, a processor, a computing device or system. In another embodiment, the MMU is coupled with or included in a server node 150. The MMU 154 stores the data item in the extent cache 310 while concurrently storing metadata for the data item in the extent index 312. The MMU 154 allocates contiguous memory blocks in the extent cache 310 for each write request so that there is no fragmentation. The MMU stores metadata describing these write requests in the extent index 312. The metadata cached in the extent index 312 includes: [a] a portable file handle that identifies a specific, unique file on an external, globally accessible file system in a storage device 160; [b] an extent descriptor, specifically, and offset and length; and [c] an ordered linked list of references to data blocks on the storage device, the linked list ordered by ascending file offset.

The MMU 154 waits for an interrupt or event to be received, as shown in block 414. This may be the expiration of a timer TMR 350, a force flush FF 360 or other stimulus received from a control process CP 370 running on a processor included in the client 110. In other embodiments, the control process may execute in a processor in the MMU 154 itself. In an embodiment in which the MMU 154 is included in a storage node 150, the control process 370 executes on a processor in the server node 150. The task manager 340 may prioritize and process the stimuli received from the timer 350 and the force flush 360. Upon receipt of the interrupt or event as shown in block 414, the MMU transfers (moves) a data item and meta data for the data item from the extent cache 310 and extent index 312 to the commit cache 320 and the commit index 322, as shown in block 416.

Upon receipt of an interrupt or event as shown in block 420, the MMU transfers (moves) a data item from the commit cache 320 to a primary (non-cache) storage device 160, and removes the metadata for the data item from the commit index 322, as shown in block 422. When available, the MMU may use vector I/O or vector RDMA operations to move data that resides in several noncontiguous buffers within the MMU to a single contiguous buffer on the primary (non-cache) storage device 160, thereby reducing the number of I/O operations.

The commit cache 320 may be partitioned into working sets so that data accumulation, protection, and transfer activities are pipelined. Data items buffered in the commit cache 320 are immutable; that is, they can no longer be merged with other data buffered in other caches. In one embodiment, data items stored in the commit cache 320 consist of similarly sized buffers where each buffer will be stored onto a different burst buffer node. In this embodiment, during the first stage of the pipeline, all buffers are zero-padded to the desired length and data is transferred into the buffers (via zero-copy when possible). During the second stage of the pipeline, parity is computed across all buffers in the partition. During the final stage, the buffers are committed to the storage target (a storage device 160) and the working set is released.

Figure 5:
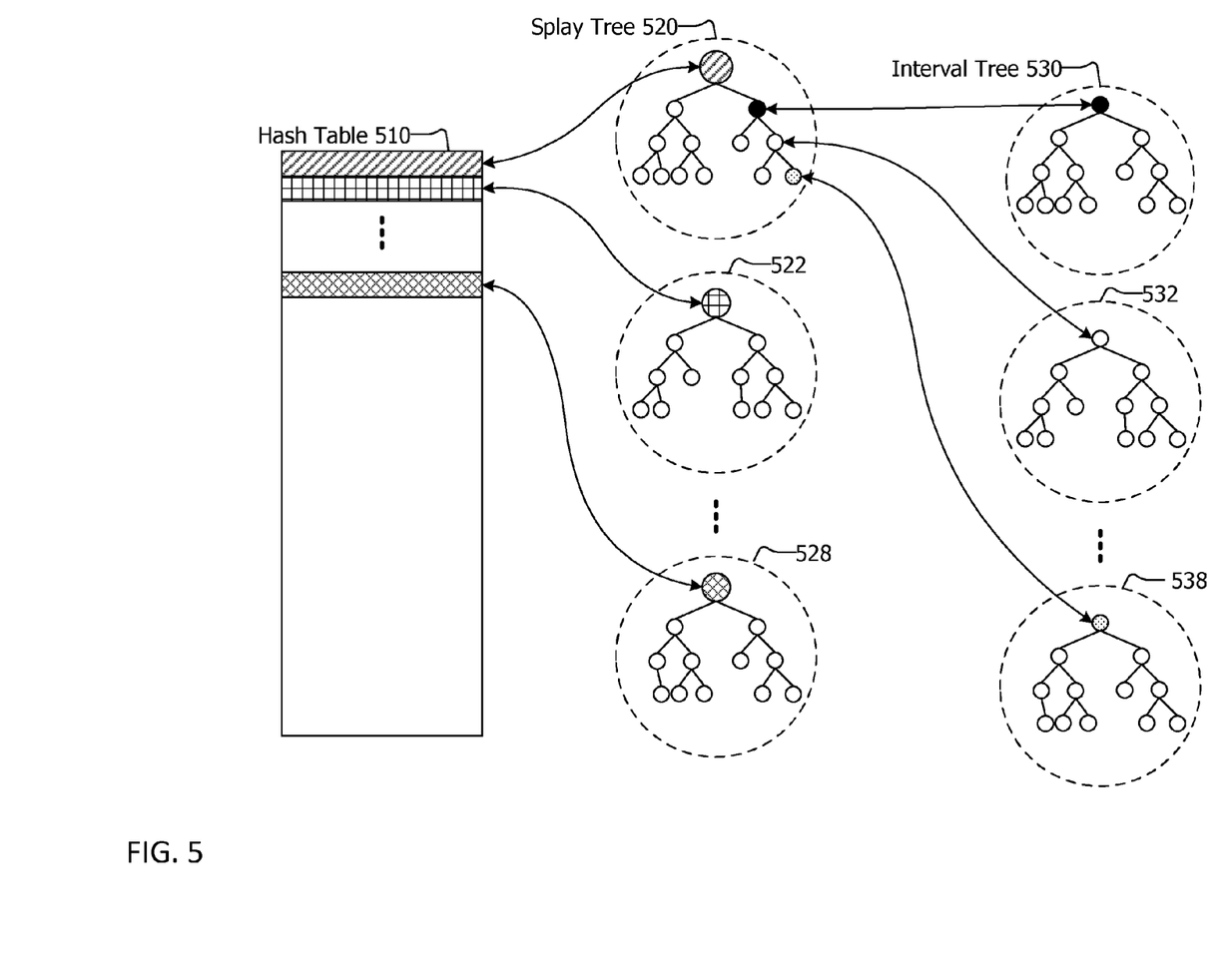
FIG. 5 is a block diagram of the data structures used to manage cache memory as described herein.

FIG. 5 is a block diagram of the data structures used to manage cache memory as described herein. The system and methods described herein use several data structures to organize and optimize the insertion of new extent data and quickly identify extent data that can be purged from the caches. The data structures consist of a hash table 510 to logically segment and map extent data items to storage devices or storage nodes, splay trees 520 of file handles to files stored in the caches, and interval trees 530 of extent data and file layouts. A file handle as used herein refers to a globally unique file identifier, such as file inode numbers for Unix-like operating systems or file IDs for Windows-based operating systems. The root nodes of the interval trees are organized into augmented splay trees. There is one splay tree for each storage device, and the nodes of each splay tree self-organize into a Most/Least Recently Used (MRU or LRU) cache of file handles, with the most recently used (that is, accessed) items near the root of the tree. There is one interval tree per each file in the splay tree. For example, the root node of interval tree 530 corresponds to a child node in splay tree 520, while the root node of the splay tree 520 corresponds to a hash table entry in the hash table 510.

Figure 6:
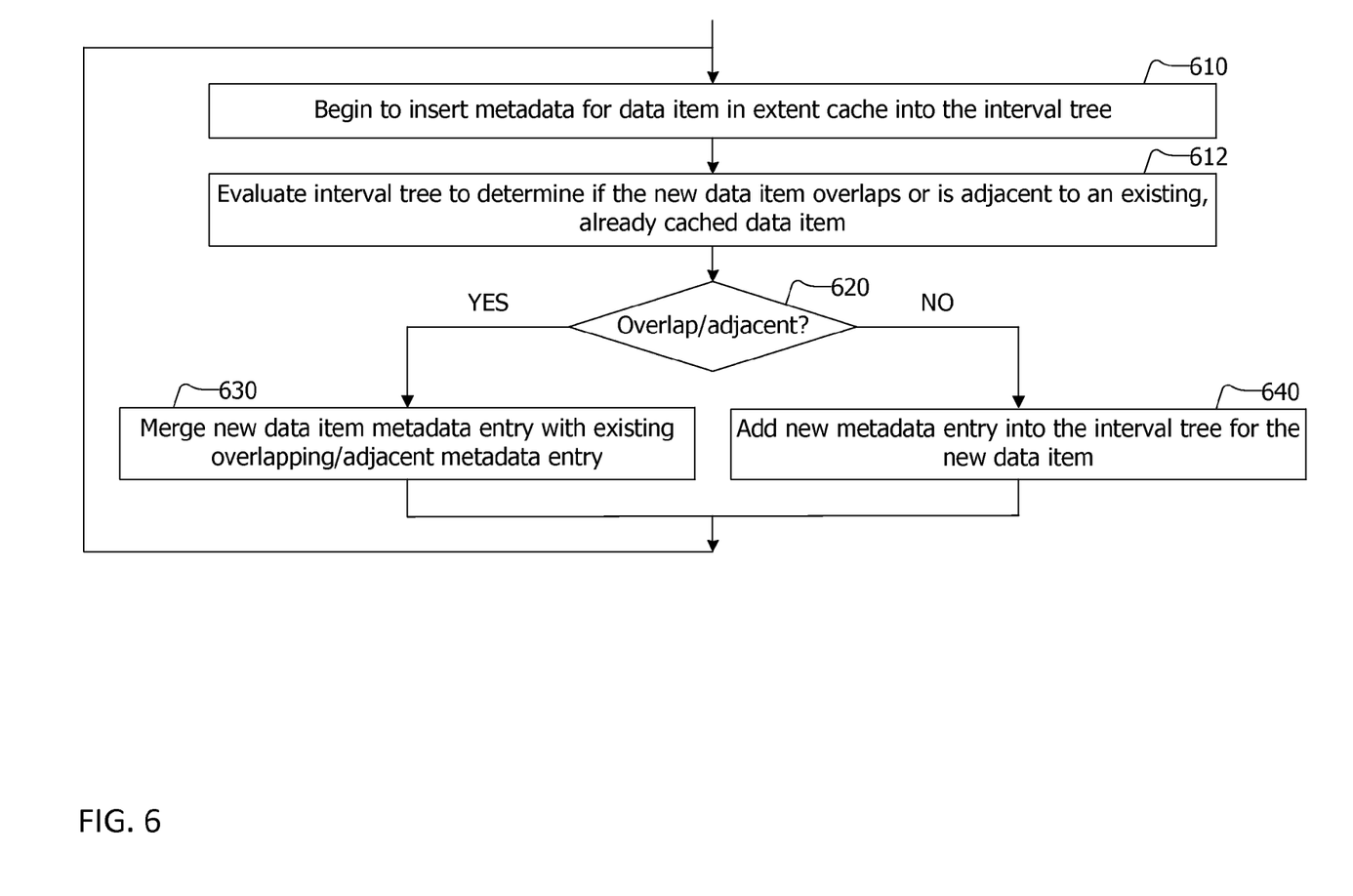
FIG. 6 is a flow chart of actions taken to manage an interval tree used in the cache memory management method described herein.

FIG. 6 is a flow chart of actions taken to manage an interval tree used in the cache memory management method described herein. An interval tree tracks and organizes extent data items. An interval tree is a data structure used to readily determine if two intervals overlap in $O(\log N)$ time, where N is the total number of continuous intervals in the tree where each interval is represented by a node in the tree. The metadata for each data item stored in the extent cache is inserted into an interval tree. The CP begins to insert metadata for a data item in the extent cache into the interval tree, as shown in block 610. On insertion of a new extent data item in the interval tree, the MMU evaluates if the new data item overlaps or is adjacent to an existing already cached data item, as shown in block 612. If the new data item is found to be adjacent to or overlaps another data item already in the tree, the metadata for the new data item is merged with the existing overlapping/adjacent metadata entry, as shown in block 630. This may be achieved by removing the existing entry from the tree and inserting a new entry into the interval tree reflecting the full size and pertinent information about the combined or merged entries for the new and existing data item entries. Alternatively, this may be achieved by replacing information in the existing entry from the tree and updating it with information reflecting the full size and pertinent information about the combined or merged entries for the new and existing data item entries. This behavior allows the tree to reduce the number of unique, noncontiguous intervals. This results in reduced metadata stored which also increases the efficiency and reduces the time to access data items stored in the cache. Adding a new data item entry into the interval tree may cause merger of two existing data item entries, one on each side of the new data item entry. Therefore, in one implementation, this action will incur at most two deletions (each at $O(\log N)$ cost) and three insertions (each at $O(\log N)$ cost) on the tree in the extent cache index. When new data item entries that overlap are detected during insert operations, the system may use "last writer wins" semantics or policies for data consistency. Merging new data item entries with existing data item entries reduces the overall size of the interval tree and increases efficiency of identifying and locating data items.

If the new data item is not adjacent to and does not overlap another data item already in the tree, as shown in block 620, the MMU adds a new metadata entry into the interval tree for the new data item, as shown in block 640.

The interval tree may be augmented to track the extremes of the intervals and the total bytes buffered to help guide data staging operations and provide heuristics. The augmentation statistics require no additional processing overhead to compute, but use storage space in each interval tree node to cache results. Given a data item range, the sub-tree that contains all sub-extent data items can be isolated in the interval tree in O(log N) time since the interval tree is dictated by the behavior of self-balancing binary search trees and can use the augmentation to accelerate the search. These aggregate statistics enable other activities to identify sub trees (consisting of one or more intervals) to process. Further, the aggregate statistics can help identify specific subtrees to prune and stage between different cache storage media when the cache is under pressure. These statistics may be used as a convenient and optimized way to evaluate which cached data to swap out.

As mentioned above, the root nodes of the interval trees are organized into augmented splay trees, one splay tree for each storage device or storage node. Splay trees are used to order nodes based on the frequency of access and store the most recently accessed data near the root of the tree while organizing the data into a binary search tree. As such, this allows the system to more quickly access recently accessed files compared to other possible metadata storage arrangements and use binary search algorithms to locate any data item managed by the tree. The splay tree may be augmented so that stale or infrequently accessed nodes (files) are pruned from the tree.

Figure 7:
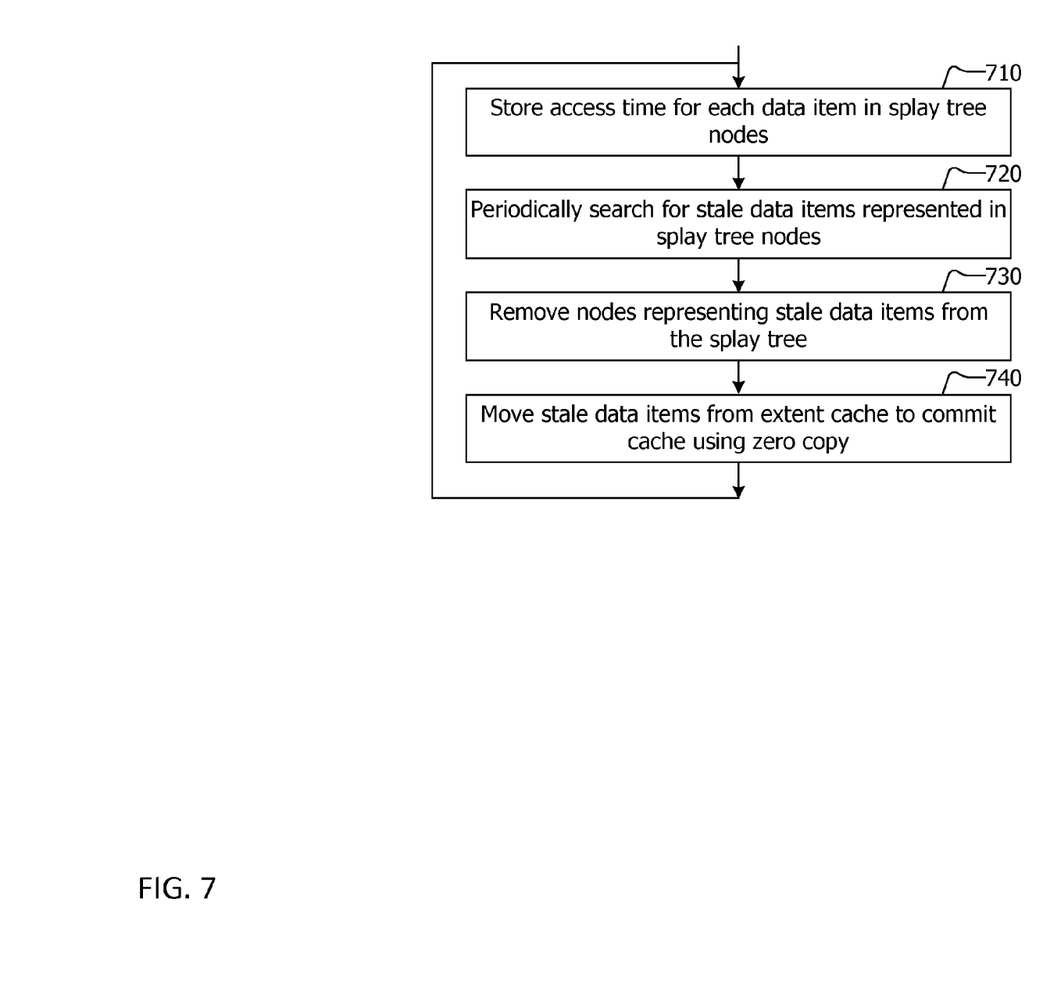
FIG. 7 is a flow chart of actions taken to manage a splay tree used in the cache memory management method described herein.

FIG. 7 is a flow chart of actions taken to manage a splay tree used in the cache memory management method described herein. The MMU stores the access time for each data item in splay tree nodes, as shown in block 710. This allows for tracking the time since the last access for any node (data item) and the time the node (data item) was inserted into the tree. In one embodiment, the MMU periodically searches the splay tree for stale data items represented in splay tree nodes, as shown in block 720. That is, the MMU searches for nodes (data items) that are of a specific age (based on insert time) or staleness (based on last access time). This may be done at a system set interval, and/or may be configurable so that a user specified interval may be used. In addition, depending on the implementation, the pruning may occur regardless of current activity or may only be conducted during lulls or reduced or lower activity periods. The MMU removes the nodes representing stale data items from the splay tree, as shown in block 730. The MMU moves stale data items from the extent cache to the commit cache using zero-copy, as shown in block 740.

The root nodes for each splay tree are stored in a hash table, and there is one hash table per MMU or storage node. The roots of splay trees are indexed into the hash table buckets, with one hash table entry (or bucket) per storage device. As the MMU data placement algorithm assigns data to storage devices with near-random data placement and routing algorithms, the metadata describing the cached data items are inserted into the splay tree according to the identified hash table entry.

Additionally, the system uses the hash table to track the amount of data pending for each storage device by tracking the amount of data cached in each hash table bucket. If cache pressure is too high or if a high-watermark or capacity threshold is reached for a specific storage device bucket, the system uses the hash table to prune nodes from the splay and interval trees and to transfer those data items to the commit cache. Bulk data associated with these nodes is zero-copied into the commit cache buffers from the extent cache. Additionally, if a high-capacity threshold is detected during a new write request, the client may elect to register the write request into a bucket with a lower capacity threshold.

Further, the system uses the hash table to track the availability of each storage device by tracking the responsiveness of the storage device, for example, the amount time that has elapsed since last successful write request and/or the last known availability state. The client may deem the storage target unresponsive using these metrics and may choose to the register the write request with a responsive storage target (that is, storage device).

By design, the data placement strategy for the MMU cache provides preferred affinity. That is, write requests cached by clients are assigned to hash table buckets (representing storage devices) that are the preferred target of the write request. As a consequence of the metadata reduction capabilities within the MMU, the overall storage system becomes more rigid and loses some benefits of the "write-anywhere" nature of log-structured file systems. This rigidness impacts the load balancing of the storage system and the ability of the client nodes to cache data destined for failed storage targets. To combat this behavior, the MMU allows clients to use flexible data placement polices derived from MMU metrics when making data placement decisions.

The systems and methods described herein provide for flexible data placement by clients using the MMU. This is achieved by providing multiple, alternative storage device targets generated by different parameterizations of the hashing functions and data placement algorithms. In one embodiment of the MMU, the data placement function generates alternative storage targets in conjunction with the client. In this embodiment, the client computes the first N storage targets where replicas ranks of 0 to N−1 for the write request metadata are stored within the system. This flexible data placement mechanism allows clients to select an alternative storage target to manage the data under failure conditions. The failure conditions are derived from information about a storage target that was algorithmically computed by the hashing and data placement functions to be in a failure state. In another embodiment of the MMU data placement function, storage targets are selected that are responsible for managing data that resides near the write request data within the logical file. That is, the data placement function biases its storage target alternatives to targets that manage data within the same file and within predefined offsets from the write request. For example, this data placement function registers the write request for file X at offset Y bytes with an alternative storage target because that storage target is primarily responsible for managing data for file X within Z bytes of offset Y. This alternative storage target is deemed acceptable because it is managing related data in close proximity to the storage request which may enable further optimization via write request merging or scheduling.

The MMU uses the additional storage targets generated by the parameterized hash functions and the metrics tracked by the MMU, such as the pending data tracked per each storage device, to select the appropriate storage target. While the data placement function biases storage target selection to the preferred storage devices, the MMU utilizes heuristics based on the metrics to bias data placement to other nodes that does not follow the data layout computed by the hash functions. In one embodiment of the MMU, if the preferred storage target is overloaded with write requests as reported by the MMU metrics, an alternative storage target computed by the parameterized hash functions can be used to help load balance the system. The write request is registered with the alternative storage target on the client cache and these alternative targets treat these write requests as foreign metadata and bulk data. In context of the larger storage system, the I/O storage targets are responsible for registering foreign metadata with the preferred storage targets and registering a foreign bulk data descriptor with the preferred storage target.

The rigidness of the default MMU hashing and data placement algorithm is problematic when dealing with failed storage targets. As the MMU is aggregating write requests, it may accumulate an indefinite amount of write requests for a storage target that has failed or is unresponsive. In doing so, accumulated requests for that target may fill the MMU cache with data that cannot be purged or flushed. By relaxing the rigidness of the data placement and hashing functions, the MMU can select additional storage targets that are deemed available. The MMU can use the availability metrics collected for each storage target within the hash table and a set of heuristics to select alternative storage targets. In one embodiment, when the client attempts to cache a write request for a failed storage target, the MMU selects an alternative storage target using the replica rank data placement heuristic. This allows the MMU to place onto storage targets that are responsible for managing replicas of write request metadata and serve as backups for the failed storage targets.

When the client learns of a storage target failure, it proactively evaluates the contents of the MMU cache and redistributes any write requests registered with the failed storage target. This redistribution is accomplished by marking the storage target entry in the hash table as nonresponsive so that no other entries are registered with that entry (storage target) and all registered entries are registered with the alternative failover targets for each write request, using the hashing and data placement functions to identify the replica or backup alternative storage targets.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A data storage method comprising:
   receiving a write request from client for a data item;
   storing the data item in an extent cache while concurrently storing metadata for the data item in an extent index including updating an interval tree, the updating including
   evaluating the interval tree to determine if the data item overlaps or is adjacent to an already cached data item,
   when the data item overlaps or is adjacent to an already cached data item, merging the metadata for the data item into the interval tree,
   when the data item overlaps or is adjacent to an already cached data item, adding a new metadata entry for the data item into the interval tree;
   upon receipt of a first interrupt or event, moving the data item and the meta data for the data item from the extent cache and the extent index to a commit cache and a commit index;
   upon receipt of a second interrupt or event, moving the data item from the commit cache to a primary storage device and removing the metadata for the data item from the commit index.

2. The method of claim 1 wherein the merging the metadata for the data item into the interval tree includes:
   removing an existing entry from the interval tree for the already cached data item; and
   adding a new entry into the interval tree reflecting a full size and pertinent information about a combined entry for the new and existing data item entries.

3. The method of claim 1 wherein the merging the metadata for the data item into the interval tree includes:
   replacing information in an existing entry from the interval tree for the already cached data item with information reflecting a full size of a combined entry for the new and existing data item entries.

4. The method of claim 1 further comprising:
   calculating metrics based on information stored in the interval tree including pending data to be stored to a particular primary storage device;
   load balancing data and metadata stored in the extent cache and extent index based on the metrics obtained by the calculating.

5. The method of claim 1 further comprising:
   load balancing data and metadata stored in the extent cache and extent index based on failure information provided by at least one client.

6. The method of claim 1 wherein the client is a computing node of a supercomputer or compute cluster.

7. The method of claim 1 wherein the client is a server computer or computer workstation.

8. The method of claim 1 wherein the primary storage device is a hard disk drive or a non-volatile memory device.

9. The method of claim 1 wherein extent cache, the commit cache, the extent index and the commit index are included in a memory management unit coupled via a high speed interconnect to the client.

10. The method of claim 1 wherein extent cache, the commit cache, the extent index and the commit index are included in a cache memory comprising non-volatile memory.

11. A computer system comprising:
a plurality of clients including a plurality of processors;
a plurality of storage nodes coupled with the plurality of clients;
a memory management unit included in each of the clients, the memory management unit including a multi-tiered cache memory, the cache memory including an upper level comprising an extent cache and an extent index and a lower level comprising a commit cache and a commit index, wherein each client and corresponding memory management unit operate in conjunction to perform actions including:
receiving a write request for a data item;
storing the data item in the extent cache while concurrently storing metadata for the data item in the extent index including updating an interval tree, the updating including
evaluating the interval tree to determine if the data item overlaps or is adjacent to an already cached data item,
when the data item overlaps or is adjacent to an already cached data item, merging the metadata for the data item into the interval tree,
when the data item overlaps or is adjacent to an already cached data item, adding a new metadata entry for the data item into the interval tree;
upon receipt of a first interrupt or event, moving the data item and the meta data for the data item from the extent cache and the extent index to the commit cache and the commit index;
upon receipt of a second interrupt or event, moving the data item from the commit cache to a primary storage device and removing the metadata for the data item from the commit index.

12. The computer system of claim 11 wherein the merging the metadata for the data item into the interval tree includes:
removing an existing entry from the interval tree for the already cached data item; and
adding a new entry into the interval tree reflecting a full size and pertinent information about a combined entry for the new and existing data item entries.

13. The computer system of claim 11 wherein the merging the metadata for the data item into the interval tree includes:
replacing information in an existing entry from the interval tree for the already cached data item with information reflecting a full size of a combined entry for the new and existing data item entries.

14. The computer system of claim 11 wherein the actions further include:
calculating metrics based on information stored in the interval tree including pending data to be stored to a particular primary storage device;
load balancing data and metadata stored in the extent cache and extent index based on the metrics obtained by the calculating.

15. The computer system of claim 11 wherein the action further include:
load balancing data and metadata stored in the extent cache and extent index based on failure information provided by at least one of the clients.

16. The computer system of claim 11 wherein the clients are arranged as a supercomputer or compute cluster.

17. The computer system of claim 11 wherein the primary storage device is a hard disk drive or a non-volatile memory device.

18. The computer system of claim 11 wherein the memory management unit is coupled via a high speed interconnect to the clients.

19. The computer system of claim 11 wherein the cache memory comprises non-volatile memory.

20. The computer system of claim 11 wherein the interval tree operates in conjunction with a splay tree organized so that more recently accessed data items appear higher in the splay tree, such that a root of the interval tree is a child in the splay tree.

* * * * *